Patented July 7, 1953

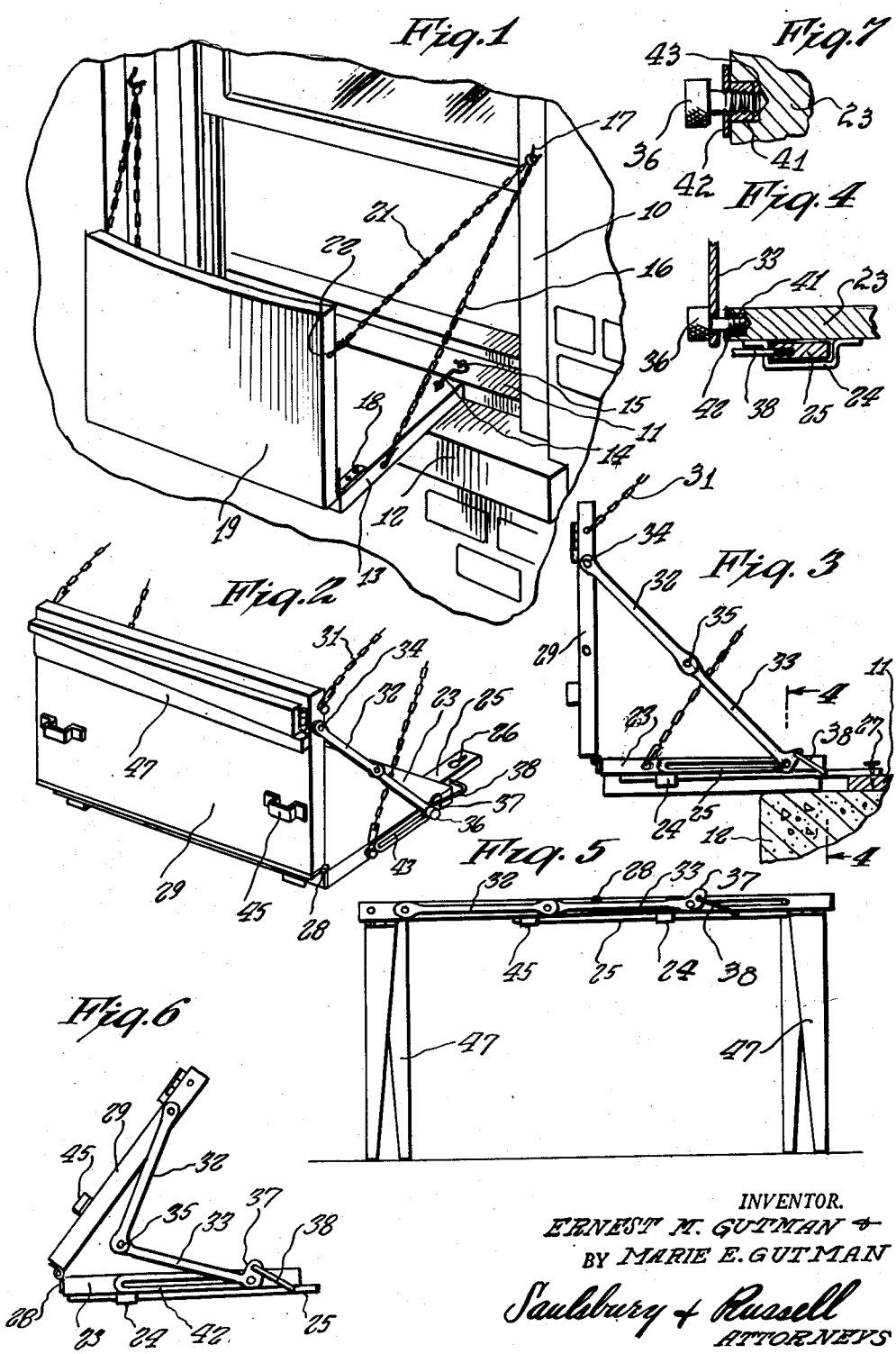

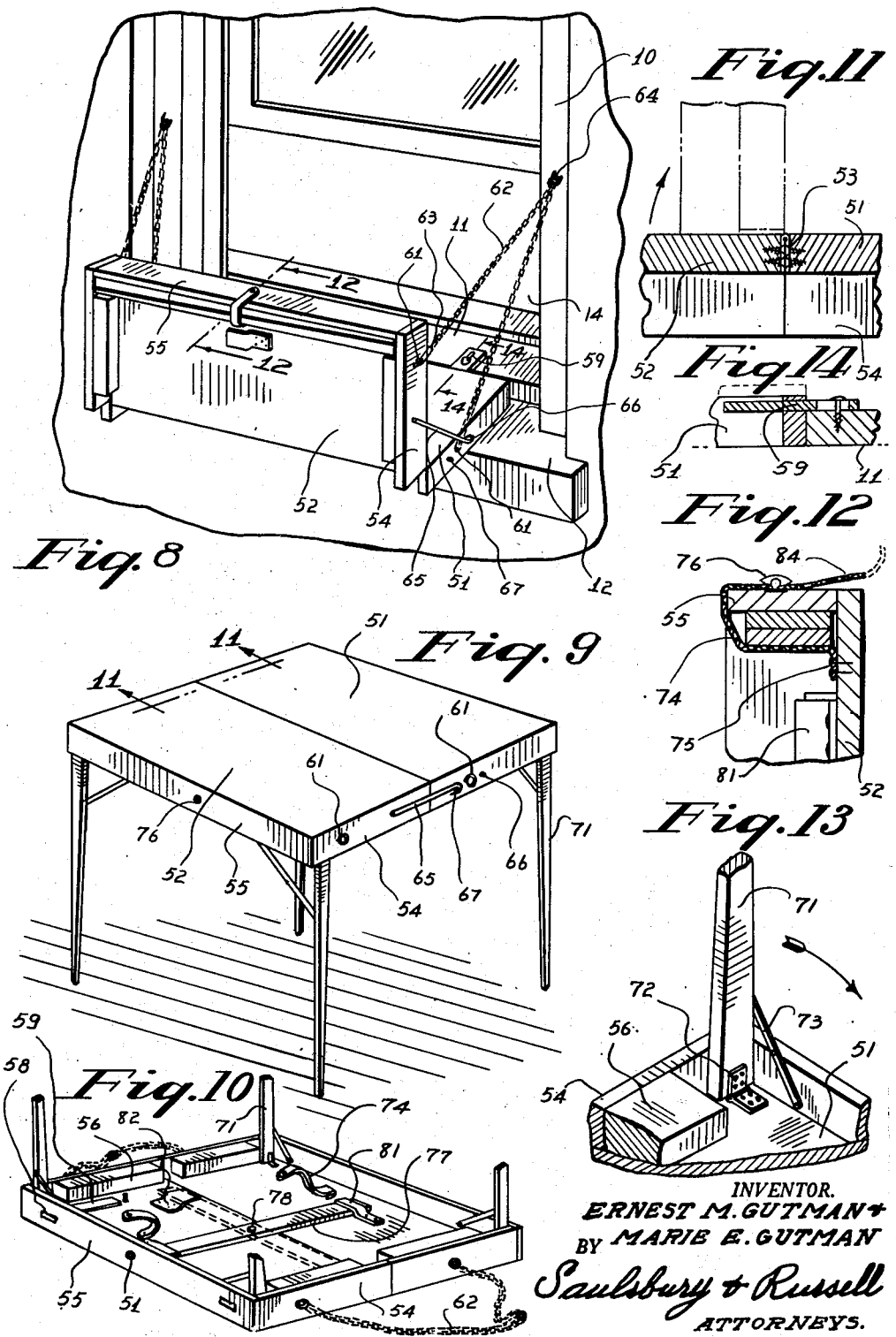

2,644,507

UNITED STATES PATENT OFFICE 2,644,507

COMBINED SAFETY SEAT FOR WINDOWS AND TABLE STRUCTURE

Ernest M. Gutman and Marie E. Gutman, New York, N. Y.

Application September 18, 1948, Serial No. 49,914

1 Claim. (Cl. 155—43)

This invention relates to a combined safety seat for windows and table structure.

It is an object of the present invention to provide a safety seat for windows which is adapted to be extended and secured to a window sill in such a manner as to support a person who may be working upon the window from the exterior thereof and wherein the parts of the seat may be folded into small space as at times when the window seat is to be stored or wherein there is provided an arrangement whereby the seat may be used as a table indoors at times when it is not being used in the window and may actually form a part of the furniture of the household.

It is another object of the present invention to provide in a combined window seat and table structure a latch device operable in one direction to extend portions serving for the connection of the seat to the window sill and operable in another direction to serve to retain in horizontal positions the combined seat and back parts in order to serve as the table top and wherein braces, when extended, serve automatically to extend the attaching portion of the seat for connection with the window sill.

Other objects of the present invention are to provide a combined window seat and table structure which is easy to adjust to form either a seat, a table, or to fold for storage, is of simple construction, inexpensive to manufacture, convenient to use, safe and durable and efficient in operation.

For other objects and for a better understanding of the invention, reference may be had to the following detailed description taken in connection with the accompanying drawing, in which Fig. 1 is a perspective view of a seat of the present invention connected to a window sill and suspended from the window frame to support a person seated thereon.

Fig. 2 is a perspective view of a combined window seat and table structure with the structure folded for use as a seat and with the attaching portion extended to be secured to the window sill.

Fig. 3 is a side elevational view of the combined seat and table shown in Fig. 2.

Fig. 4 is a detail sectional view taken on line 4—4 of Fig. 3.

Fig. 5 is a side elevational view of the combined structure opened in such a manner as to provide a table and with the latch extended to a position to connect the seat part and the back part together and in horizontal positions.

Fig. 6 is a side elevational view of the combined seat and table partly folded together.

Fig. 7 is a fragmentary enlarged sectional view of a constructional detail as shown in Fig. 4.

Fig. 8 is a perspective view of a modified form of a combined seat and table structure, but with the structure being used as a seat on a window sill.

Fig. 9 is a perspective view of the modified combined seat and table shown in Fig. 8.

Fig. 10 is a perspective view looking upon the bottom of the table top with the parts extended to form a table and the latch turned to connect the parts together in their extended position, the legs extended and portions of the same broken away.

Fig. 11 is a sectional view taken on line 11—11 of Fig. 9.

Fig. 12 is an enlarged sectional view taken on line 12—12 of Fig. 8.

Fig. 13 is a fragmentary perspective view looking into the bottom corner and upon one of the legs which have been extended.

Fig. 14 is an enlarged sectional view taken on line 14—14 of Fig. 8.

Referring now to Fig. 1, 10 represents a window frame having a sill 11 resting upon a block 12 extending from the exterior of a building. My seat comprises a bottom 13 which is rested upon the block 12 and is connected at opposite ends by hook fasteners 14, only one shown, respectively, with eyes 15 on the window sill 11. This bottom is supported by a chain 16 extended over a hook 17 fixed to the window frame 10 at an elevated location. Connected to the seat 13 by hinges 18 is a back rest 19. This back rest is raised from the seat when the seat is connected to the window frame. A chain 21 is connected to each side of the back rest 19 and at an elevated position thereon as at 22 and has its upper end extended over a hook 17 whereby to support the back rest against outward displacement.

Referring now more particularly to Figs. 2 to 7, there is shown my combined window seat and table structure. This structure has a seat 23 corresponding to the seat 13 of the first form of the invention, on the bottom of which are guides 24 for receiving and retaining slide attaching and latch members 25. There is one of these members 25 at each side of the seat. Each member has a key hole slot 26 therein adapted to be extended over a pin 27 on the window sill 11. Hinged by hinges 28 to the rear of the seat part 23 is a second part 29 which may serve as a back rest when extended to a vertical position as shown in Fig. 2. This part 29 can be coupled by chains 31 with a hook on the window frame and may be held against displacement relative to the seat part 23 by foldable brace parts 32 and 33. The brace part 32 is pivotally connected to the side edge of the back rest 29 at 34 and to the part 33 by a pivot pin 35. The part 33 is pivotally connected to the seat part 23 by a removable thumb screw 36, Fig. 4.

The lower end of the brace part 33 has a projection or arm 37 to which is pivotally connected a link 38 bent and extended into the side of the slide latch 25. As the seat and back parts are separated from one another from positions where they lie parallel to one another and in the manner as illustrated in Fig. 6 with the back partly extended from the seat, the brace element 33 will extend forwardly the link 38 and the slide latch 25 so that the latch will be positioned properly for its connection over the pin 27 on the window sill. Automatically as the seat and back parts are folded together, the slide latches 25 will be withdrawn or retracted.

If it is desired to form the structure into a table, the screw 36 is loosened to release a slide 41 from the inner face of retaining plate 42 whereby the slide is free to move in a slot 43 in the side edge of the seat. The back 29 can be pivoted rearwardly and upon so doing, the side latches 26 will be pulled rearwardly by the brace elements 32 and 33 as they are straightened out and the back part 29 will arrive at a horizontal position so that brackets 45 thereon will respectively receive the rear ends of the slide latches 25 whereby to support the hinges 28 and the parts 23 and 29 against downward and upward displacement. The brace elements 32 and 33 will be straightened out as shown in Fig. 5, and lie along the side of the table. On each of the parts 23 and 29 is a pair of legs 47 which may be hinged down to support the parts which have been coupled together. If desired, the screw 36 may be tightened in the slot 43 and against the plate 42.

If it is desired to prepare the table so that it may be used as a seat for the window, the parts are folded upwardly and toward one enother and the brace elements 32 and 33 will cause the slide 41 to be moved in the slot 43 and upon arriving at the end of the slot, the screw 36 can be tightened to fix the slide against movement. Thereafter, the brace element 33 will pivot upwardly and the link 38 will push forwardly the slide 25 to its attaching position upon the pin 27. If the brace elements 32 and 33 are folded so that their pivot connection 35 moves inwardly, the slide 25 will be retracted.

It will be apparent that the operation of the slide 25 is automatic and is effected through the brace elements 32 and 33. These brace elements will serve to prevent the back rest 29 from falling rearwardly and at the same time are useful to operate the slide 25. The slide latch 25 serves a double purpose. When the slide latch is in one position, it serves for the connection of the seat part 23 with the window sill, and when in another position, it serves to connect together the parts 23 and 29 against displacement relative to one another.

Referring now particularly to the form of the invention shown in Figs. 8 to 14, 51 and 52 represent respectively seat and back portions of the combined window seat and table construction which are hinged together by a hidden hinge 53, Fig. 11, in the side edges of the portions. Each of the portions has side boards 54 and 55 and blocks 56 disposed at the opposite sides of the portions and adjacent the side boards 54 to serve as a resting surface for the portion 51 when the same is rested upon the window block 12. In the side board 55 are slots 58 through which may be extended attaching slides 59 having holes therein for receiving pin projections on the window sill 11. When the unit is to be used as a table, these slides 59 are withdrawn.

On each of the side boards 54 are eyes 61 to which chains 62 are attached by their snap fastener elements 63. These chains are extended over hooks 64 on the window frame 10. These chains support the seat when on the window sill. As a further means for securing the seat parts in the positions shown in Fig. 8, a pivot hook 65 is connected between the parts to serve as braces. Two projections 66 and 67 are provided on the side board 54 of the seat part 51 to receive the hook 65. The hook will extend over the projections 66 when the parts are being used as a seat and over the projection 67 when the parts are being used as a table as shown in Fig. 9.

Foldable into each of the outer corners of the parts is a leg 71. This leg is connected to the parts by a hinge 72 and is held in its extended position by a collapsible bracket 73, Fig. 13. The legs are preferably tapered. The legs of each part are secured by straps 74 when not in use. The straps 74 are tacked as indicated at 75 to the bottom face of the part and can be extended over the legs and over the side board 55 for connection with a turn projection 67, Fig. 12.

The parts are held in place to form a table by rigid pivot strip 77 pivotally connected as at 78, Fig. 10, to the part 51 as seen in Fig. 11 and movable from a dotted line position to an extended position across the bottom faces of the parts so that its end has engagement with retaining clips 81 engaging respectively with the opposite ends of the strip 77 and fixed respectively to the parts. A similar clip 82 is used to retain the strip 77 in its dotted line position 79 on the part 51.

It should be apparent that when the structure is not being used either as a seat or table that the parts 51 and 52 can be folded upon one another in back to back relationship whereby to consume little space when the structure is being stored. An additional strap such as a carrying strap 84 can be secured to the buttons 76 on the side board portions 55 of the parts.

While various changes may be made in the detail construction, it shall be understood that such changes shall be within the spirit and scope of the present invention as defined by the appended claim.

We claim:

A combined window seat and table structure which comprises two parts hinged together, slide latches operable upon the parts to be extended from one of the parts to an attaching position for connection with a window sill and in another position to connect together the parts to retain them against pivotal displacement relative to one another, legs extendable from the parts to support the parts when connected together against angular displacement relative to one another in an elevated and table fashion, and means connected between the parts and operable upon the slide latches to effect their operation as the parts are pivoted relative to one another, said means for effecting the operation of the slide latches comprising brace elements pivotally connected together, one of said brace elements pivoted to one part, the other of said brace elements having an arm, a link connected between the arm and the slide latch, a screw pin extending through said one brace element, a slide receiving the screw pin, one of said parts having a guide slot, a plate extending over the guide slot to hold the slide in place against outward displacement therefrom but permitting the longitudinal movement of the slide in the slot, said screw pin being adjustable through the slide to cause the tight frictional engagement of the slide with the plate whereby to retain the slide and the end of the other brace element in one end of the slot and against displacement therefrom.

ERNEST M. GUTMAN.
MARIE E. GUTMAN.

References Cited in the file of this patent

UNITED STATES PATENTS

| Number | Name | Date |
|---|---|---|
| 404,355 | Jacob | May 28, 1889 |
| 657,511 | Bulasky | Sept. 11, 1900 |
| 1,016,841 | MacDonald | Feb. 6, 1912 |
| 1,421,929 | Floreskul | July 4, 1922 |
| 1,473,370 | Heller | Nov. 6, 1923 |
| 1,501,438 | Cohen | July 15, 1924 |
| 1,503,305 | Dolaro | July 29, 1924 |
| 1,619,124 | Hoszowski | Mar. 1, 1927 |
| 1,646,509 | Wais | Oct. 25, 1927 |
| 2,426,070 | Todd | Aug. 19, 1947 |